Aug. 25, 1964     L. J. COLBERT     3,145,421
CABLE SPLICING DEVICE
Filed Dec. 27, 1961
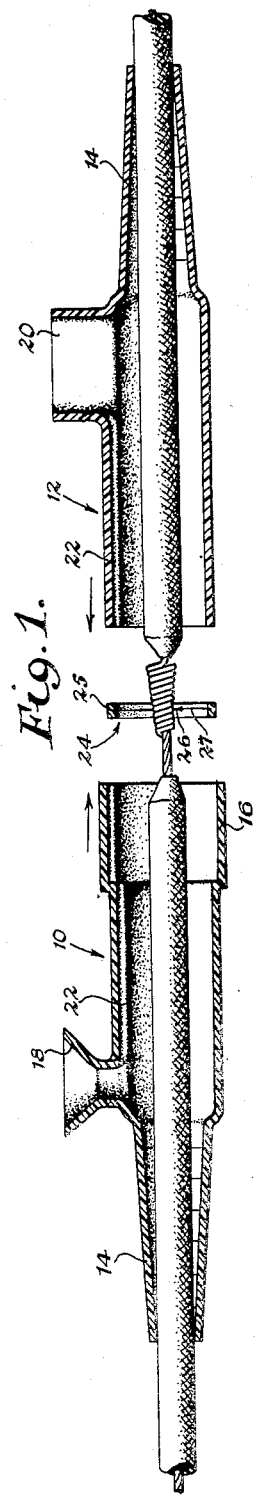
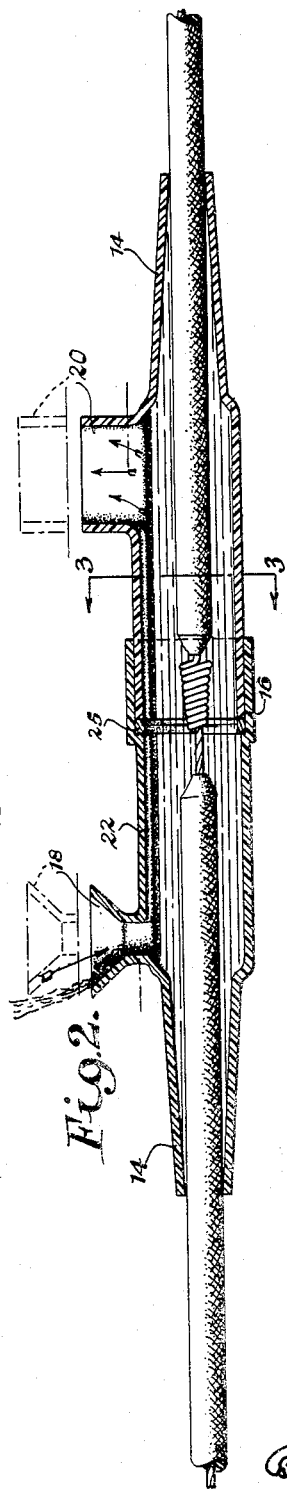
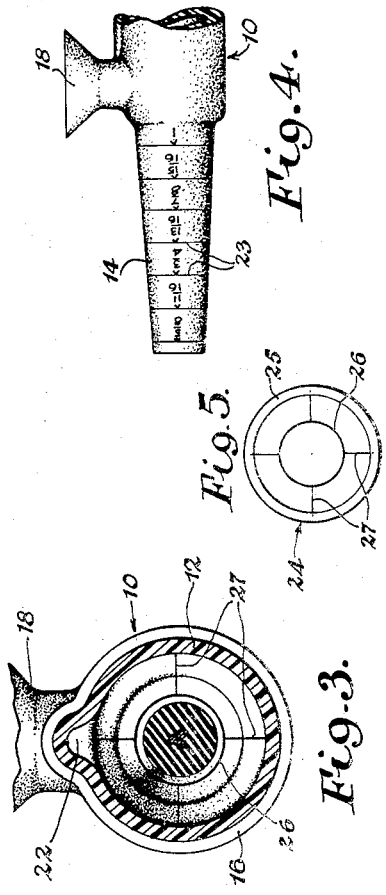
INVENTOR.
LEE J. COLBERT
BY
Bean, Brooks, Buckley + Bean
ATTORNEYS

# United States Patent Office 3,145,421
Patented Aug. 25, 1964

3,145,421
CABLE SPLICING DEVICE
Lee J. Colbert, 58 Smallwood Drive, Snyder, N.Y.
Filed Dec. 27, 1961, Ser. No. 162,475
2 Claims. (Cl. 18—36)

This invention relates to cable splicing devices and more particularly to a new and improved pod or mold for use in connection with the potting or encapsulating of splices or joints in electrical conductors and the like.

The primary object of the invention is to provide a new and improved splice encapsulating pod which may be used with greater ease and speed than prior art devices.

One specific object of the invention is to provide a pod as aforesaid which comprises only two, easily manipulated, parts.

Another object of the invention is to provide a pod as aforesaid which offers improved sealing of the ends thereof around the cable being spliced.

Still another object of the invention is to provide a pod as aforesaid which includes efficient means for avoiding the entrapment of air in the resin or the like which is used to encapsulate the splice.

Other objects and advantages of the splicing pod of the invention will appear from the detailed description hereinbelow and the accompanying drawings wherein:

FIG. 1 is a sectional view of the splicing pod of the invention before the pod is assembled in potting material receiving position;

FIG. 2 corresponds to FIG. 1 but shows the pod in assembled position with the encapsulating step completed;

FIG. 3 is a sectional view taken substantially along line 3—3 of FIG. 2;

FIG. 4 is a fragmentary elevational view of the device of FIG. 1; and

FIG. 5 is an elevational view of one part of the pod of the invention.

Referring now specifically to FIG. 1, one specific embodiment of a splicing pod of the invention is shown to comprise two generally cylindrical tube members 10 and 12, the outer end of each segment being provided with a tapered portion 14 and with the inner end of the segment 10 being provided with an expanded section 16. Thus the two sections may be brought together with the inner end of segment 12 fitting telescopically with the expanded portion 16 of segment 10 (FIG. 2). The segment 10 is further provided with a funnel opening section 18 and the segment 12 is provided with an air vent opening 20. Both segments are formed with a venting channel 22 which extends from the funnel portion 18 and the venting opening 20 respectively to the inner ends of the respective segments 10 and 12.

As seen in FIG. 4 the tapered end portions as illustrated on the segment 10 are provided with markings 23 indicating its inner diameter at the points so marked so that when it is desired to use the splicing pod with a specific cable the tapered ends of the segments 10, 12 may be cut off at the point where the inner diameter is substantially the same as the outer diameter of the cable being spliced, thus assuring a snug fit between the pod ends and the cable.

In use, the tapered ends of the respective segments of the pod are cut off as described hereinabove and one of the segments is slipped over each of the ends of the cable to be spliced as seen in FIG. 1. The splicing of the cables is then executed in any of the various known methods.

When the splice is ready for potting the two segments are slipped together as seen in FIG. 2. Th pod is then ready to receive any one of the prepared splice potting materials which may be used (usually a quick-hardening resin), the material being poured into the pod through the funnel opening 18. The ends of the pod are sealed by the close fit of the end portions thereof to the cable and entrapment of air during the pouring operation, which has been a problem in a number of the prior art devices, is avoided by the provision of the venting channel 22 which terminates at the venting opening 20. After the encapsulating material has solidified, the protruding funnel end and vent portions may be cut off to provide a pod without protuberances or in some cases it may be desired to slit the pot lengthwise and peel it off thereby giving a finished splice of lesser diameter.

In order to assure having a certain minimum thickness of the encapsulating material covering the spliced area at all points therearound, a locating web 24 may be used as an aid in assuring that the position of the device being spliced is maintained sufficiently near the center of the pod throughout its length. The locating web is shown to comprise an outer supporting ring 25 which may be formed of the same material as the pod and an inner circular web 26 of much finer construction which can be held within the supporting ring by very fine strands 27 of any desirable material such as nylon. The web and strands 26, 27 may desirably be fabricated from material which will dissolve in and be absorbed by the encapsulating material so that there will be no paths through the material having dielectric properties differing from the encapsulating material. The locating web is dimensioned to fit within the assembled pod as shown in FIG. 2.

From the foregoing it will be apparent that the splicing pod of the invention provides means for forming potted splices with extreme facility, a minimum number of parts to be handled and with a superior end seal which is accomplished without entailing time consuming steps such as wrapping the ends of the pod with tape or similar devices as are necessary with most of the previously known pods.

Although only one form of the splice potting pod of the invention has been shown and described in detail it will be appreciated that changes and modifications may be made therein without departing from the spirit of the invention or the scope of the appended claims.

What is claimed is:

1. A member for potting splices, comprising
   a pair of sections adapted to be engaged at their inner ends to form a pod encapsulating a spliced conductor,
   each section including a cylindrically tubular main body portion and a gradually tapered outer end portion joined to the main body portion,
   one section having a filling neck adjacent the juncture between its main body and outer end portions and the other section having a vent neck adjacent the juncture between its main body and outer end portions,
   the inner end of one of said sections being enlarged to receive the inner end of the other section and the two sections having outwardly deformed wall portions extending from their inner ends to their respective necks to (*a*) align said necks when the sections are engaged and (*b*) form an internal vent channel extending between said necks.

2. The assembly as defined in claim 1 including an outer supporting ring received within said enlarged inner end of one of said sections, an inner supporting ring adapted to embrace the spliced member, and strand means interconnecting said inner and outer supporting rings to maintain the same in concentric coplanar relation.

References Cited in the file of this patent

UNITED STATES PATENTS

| | | |
|---|---|---|
| 2,312,652 | Komives et al. | Mar. 2, 1943 |
| 2,357,998 | Campbell | Sept. 12, 1944 |
| 2,501,863 | Cox | Mar. 28, 1950 |
| 2,967,795 | Bollmeier et al. | Jan. 10, 1961 |
| 2,973,501 | Mapelsden et al. | Feb. 28, 1961 |
| 3,044,037 | Honig | July 10, 1962 |